United States Patent [19]

Aron

[11] Patent Number: 4,914,901
[45] Date of Patent: Apr. 10, 1990

[54] HAYMAKING MACHINE WITH AT LEAST ONE RAKING WHEEL EQUIPPED WITH CONTROLLED TOOL-CARRYING ARMS

[75] Inventor: Jérôme Aron, Bouxwiller, France

[73] Assignee: Kuhn S.A., Saverne, France

[21] Appl. No.: 267,089

[22] Filed: Nov. 3, 1988

[30] Foreign Application Priority Data

Nov. 17, 1987 [FR] France .................... 87 16048
Jun. 16, 1988 [FR] France .................... 88 08339

[51] Int. Cl.⁴ .......................................... A01D 78/00
[52] U.S. Cl. .................................. 56/370; 56/377
[58] Field of Search ............... 56/377, 367, 366, 375, 56/376, DIG. 10, DIG. 21, 370

[56] References Cited

U.S. PATENT DOCUMENTS

| 3,546,867 | 12/1970 | Hauser-Lienhard | 56/370 |
| 3,735,573 | 5/1973 | Dziuba et al. | 56/370 |

FOREIGN PATENT DOCUMENTS

| 0175190 | 8/1985 | European Pat. Off. | |
| 0198781 | 4/1986 | European Pat. Off. | |
| 2023248 | 5/1970 | Fed. Rep. of Germany | |
| 2833814 | 2/1980 | Fed. Rep. of Germany | 56/370 |
| 8103974 | 2/1981 | Fed. Rep. of Germany | |
| 3120370 | 5/1981 | Fed. Rep. of Germany | |
| 3601212 | 1/1986 | Fed. Rep. of Germany | |
| 2415955 | 2/1978 | France | |
| 2382176 | 3/1978 | France | |
| 2513068 | 9/1981 | France | |

Primary Examiner—Jerome W. Massie
Assistant Examiner—Terry Lee Melius
Attorney, Agent, or Firm—Oblon, Spivak, McClelland, Maier & Neustadt

[57] ABSTRACT

A haymaking machine having a frame supporting at least one raking wheel equipped with tool-carrying arms controlled during work. The raking wheel is rotatable about a support pin which carries a control cam and which is free in rotation in relation to the frame during work. The support pin is connected to at least one support which is offset in relation to the support pin in the direction of movement of the machine, with the support being stationary in relation to its connection to the support pin in the horizontal plane. The support thus assures a continuous predetermined orientation of the support pin and of control cam as a function of the direction of movement to permit formation of well-formed and regular windrows during movements of the haymaking machine both in a straight line or around curves or turns.

15 Claims, 5 Drawing Sheets 4,914,901

HAYMAKING MACHINE WITH AT LEAST ONE RAKING WHEEL EQUIPPED WITH CONTROLLED TOOL-CARRYING ARMS

BACKGROUND OF THE INVENTION

1. Field of the Invention

This invention relates to a haymaking machine including a frame with at least one raking wheel equipped with tool-carrying arms directed outward, wherein the raking wheel is guided in rotation on an approximately vertical support pin equipped with at least one support which moves over the ground during work and with a cam which controls the tool-carrying arms so that during their rotation around the support pin, the arms pivot around their respective longitudinal axes, thereby raising the work tools in a certain zone of their path, to deposit the raked products in the form of a windrow.

2. Discussion of the Background

On the type of machine above-described, the support pin of the raking wheel and the control cam are locked in relation to the frame during work. The tool-carrying arms are then controlled by the cam so that they raise their tools constantly in the same zone with respect to the frame of the machine. This type of machine makes it possible to constitute well-formed windrows when it is moved in a straight line. However, in curves or turns, the windrows formed are irregular and very often scattered. Picking up of the products with a pick-up tool such as a baler or a silage harvester is then difficult to perform.

On another type of machine, the control cam which is locked during work can nevertheless be brought into two different positions. To do this, the cam can be released and turned by an angle of about 180° before immobilizing it in the new position. The zone for depositing products can thus be located on the right side or the left side of the machine. This adjustment makes it possible to increase the possibilities of use of the same machine. The latter can actually be drawn or pushed by the tractor. The user can thus select the mode of work as a function of the nature of the products and of the fields over which he works.

However, the adjustment also does not make it possible for the machine to produce well-formed and regular windrows during movements both in straight lines and curves or turns. In addition, the adjustment of the control cam is a time loss factor especially if it must be repeated often.

SUMMARY OF THE INVENTION

Accordingly, one object of this invention is to provide a novel haymaking machine used particularly for windrowing, which does not have the drawbacks of known machines.

A related object of this invention is to provide a new and improved haymaking machine which produces well-formed and regular windrows during movements in straight lines and around curves or turns.

These and other objects are achieved according to the present invention by providing a new and improved haymaking machine in which the support pin which carries the control cam is mounted free in rotation in the frame and is connected by a connecting means to a support which is offset in relation to the support pin in the direction of advance of the machine, wherein the support is stationary with respect to the connecting means in the horizontal plane during work.

In the machine according to the present invention, the support constantly replaces itself behind the support pin and orientates automatically in the direction of movement of the machine during work. Consequently, the support also orients the control cam by the support pin of the raking wheel. The cam is then constantly positioned so that the picking up of the products laid on the ground is performed on the front half—seen in the direction of movement—of the path of the working tools, and so that the depositing of these products takes place in the vicinity of a plane perpendicular to the direction of movement and passing through the support pin of the raking wheel. This positioning of the control cam makes it possible to obtain well-formed windrows during movements in straight lines, curves and turns.

The support solid with the support pin of the raking wheel also provides automatically a pivoting of about 180° of the control cam in the case where the machine is used both as a drawn machine and as a pushed machine. In this way, there is no loss of time to go from one of these work modes to the other, which is particularly advantageous when the machine is moved alternately in forward and in reverse, to avoid turning around at the end of the field.

Another characteristic of the invention is that at least one of the supports of the raking wheel is placed so that during work it exerts a torque on the support pin with the control cam which is approximately equal and opposite the torque exerted by the rollers of the tool-carrying arms on the control cam. This characteristic makes it possible to improve the guiding provided by the support which moves over the ground. According to a very advantageous embodiment, the support which controls the position of the support pin and of the control cam is, in addition, offset laterally in relation to a vertical plane directed in the direction of movement and passing through the support pin. The support is located on the side toward which the tool-carrying arms move when they pass through the plane in the back half of their path.

Thanks to this lateral offsetting, during work there is created a torque opposite the torque exerted on the control cam and the support pin by the rollers of the tool-carrying arms. The value of the lateral offsetting is selected so as to obtain balance between the moments of the two torques. This balance facilitates the guiding provided by the support on the ground. The torque exerted by the rollers of the tool-carrying arms on the control cam no longer influences this guiding. In this way, the support moves the support pin and the cam as easily against the direction of rotation of the tool-carrying arms as in this direction.

Moreover, the guiding is also less dependent on the surface of the ground. Thanks to the balance between the torques, the rollers of the tool-carrying arms do not cause an untimely movement of the control cam as soon as the pressure of the support on the ground decreases a short instant. Thus, the positioning of the control cam is correctly assured even in fields having irregular surfaces.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
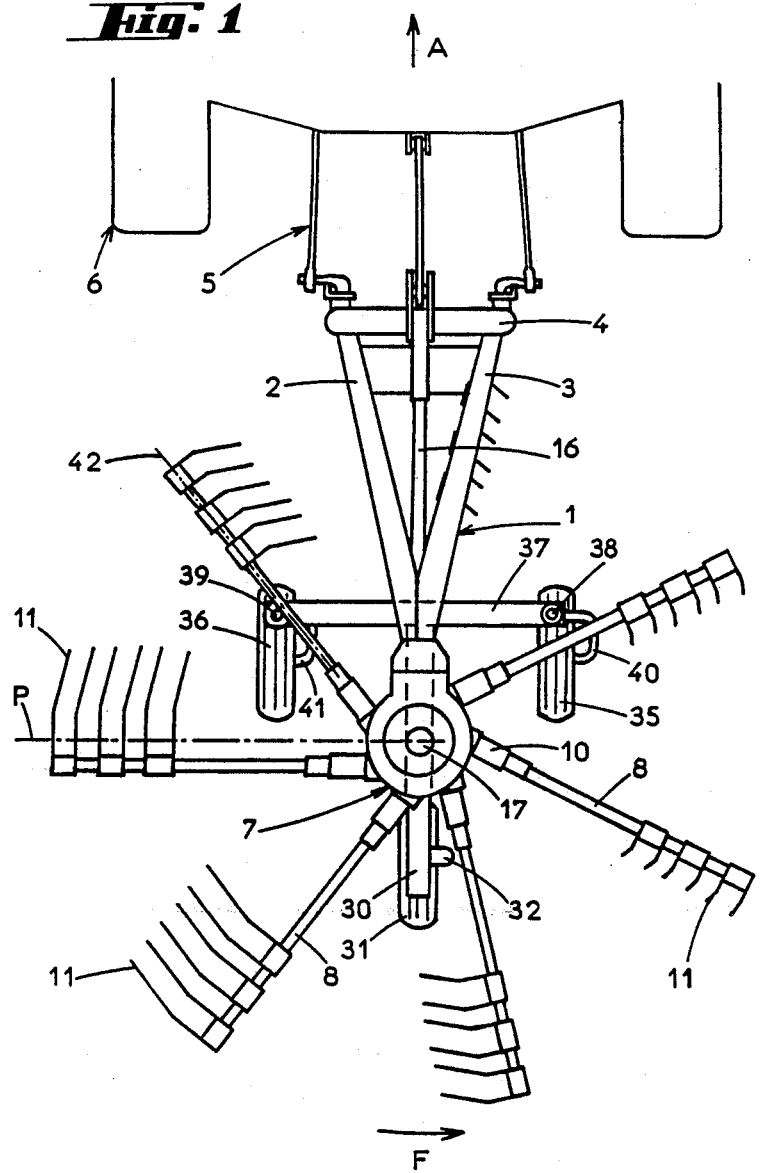
FIG. 1 is a top view of the haymaking machine according to one embodiment of the present invention.

Referring now to the drawings, wherein like reference numerals designate identical or corresponding parts throughout the several views, and more particularly to FIG. 1 thereof, the machine according to the invention includes a frame (1) formed particularly of two approximately horizontal beams (2, 3). The front ends of these beams (2, 3) are connected to a three-point hitching bracket (4) that can be coupled to the lifting device (5) of drive tractor (6) which is simply sketched in this FIG. 1.

The two other ends of the beams (2, 3) are connected to a raking wheel (7) equipped with tool-carrying arms (8).

Figure 2:
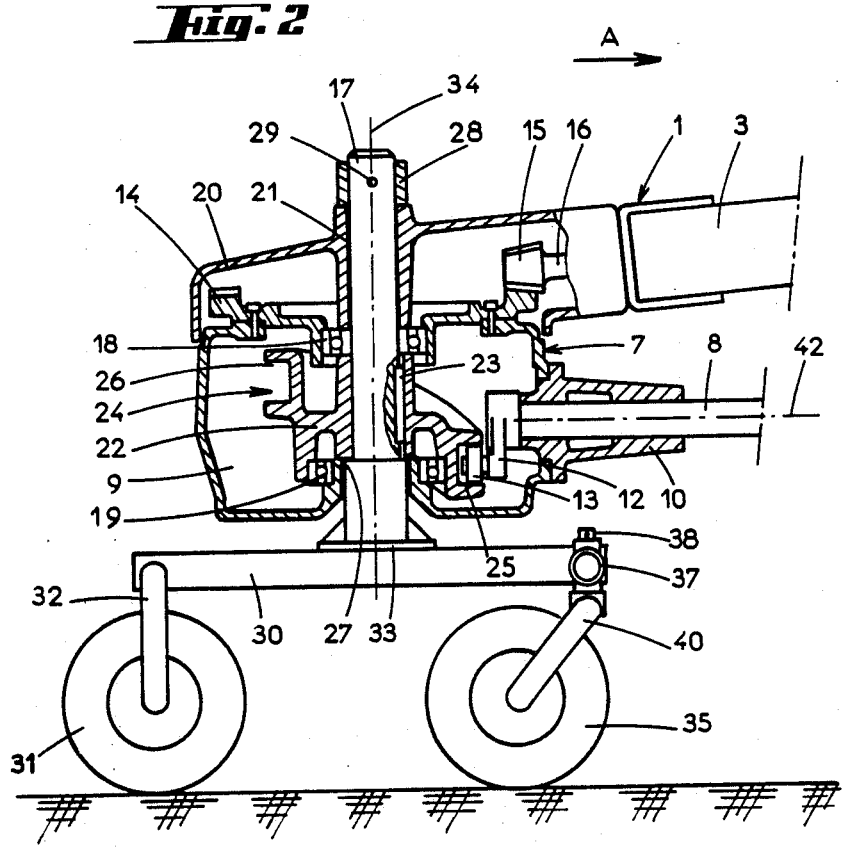
FIG. 2 is, on a larger scale, a simplified cross-sectional view of the raking wheel of FIG. 1.

It is particularly clear from FIG. 2 that this raking wheel (7) includes a central casing (9) or the like. This casing (9) includes at its periphery bearings (10) in which tool-carrying arms (8) directed outward are housed. Each of these arms (8) carries at its outside end tools (11) consisting of raking teeth. The inside end of each arm (8) comes out in casing (9) and includes a crank (12) equipped with a roller (13).

This casing (9) includes at its upper part a ring gear (14) which meshes with a pinion (15) solid with a drive shaft (16). Further, casing (9) is guided in rotation on an approximately vertical support pin (17) by means of ball bearings (18, 19). Above casing (9) a stationary cover (20) is provided that is solid with beams (2, 3) of frame (1). This cover (20) protects the ring gear (14) and pinion (15). It includes a housing (21) in which support pin (17) is guided so that it is free in rotation around its geometric axis (34). For this purpose, it can be housed there with a slight radial play. One or more guide elements such as rings, can optionally be provided in the housing (21) to guide the support pin (17).

Support pin (17) carries on its upper part, located in casing (9), a control cam (22) for tool-carrying arms (8). This cam (22) is fastened to support pin (17) by a key (23). Cam 22 includes a cam surface in the form of a guide path (24) in which rollers (13) of tool-carrying arms (8) move. This guide path (24) is approximately circular and includes a low portion (25) and a higher portion (26).

The support pin (17) is locked in translation in relation to frame (1). This is obtained by a shoulder (27) which strikes against a lower face of control cam (22) and, by a stop bushing (28) fastened at the upper end of the support pin (17) by a pin (29). The lower end of support pin (17) is connected with a connecting arm (30) to at least one support (31) which rests on the ground. This support (31) is offset backwards in relation to pin (17)—seen in the direction of advance A—and is stationary in relation to connecting means (30) in the horizontal plane. In the example shown, support (31) consists of a small wheel which rolls over the ground during work. This small wheel (31) is attached to connecting arm (30) by a column (32). This connecting arm is itself fastened, for example, with bolts to a plate (33) solid with support pin (17).

It is clear from the above-described arrangement that support pin (17), control cam (22) and support (31) are connected rigidly to one another and form an assembly that can pivot around the longitudinal geometric axis (34) of the support pin (17).

Two additional supports (35 and 36) are further connected to support pin (17) to increase the stability of the machine and to improve the adaptation to the irregularities of the ground. In relation to this pin (17), these two support (35, 36) are located on the side opposite the one on which the support (31) is located (see FIG. 2). Supports (35, 36) are parallel to one another and are located at a certain distance from one another. Their connection to support pin (17) is provided by the arm (30) which passes under the pin (17) and which carries at its end a crosswise arm (37) to which the supports (35, 36) are connected so as to be able to pivot in a horizontal plane. For this purpose, the crosswise arm (37) includes near each of its ends an approximately vertical pivot pin (38 and 39) to which corresponding support (35 or 36) is connected by a column (40, 41) that is inclined toward the back. These two additional supports (35, 36) also consist of small wheels. These supports (31, 35, 36) could also consist of rollers or pads sliding over the ground.

During work, the machine according to FIG. 1 is drawn by tractor (6) in direction A. Casing (9) is then driven in rotation in the direction of arrow F, around support pin (17). This driving is assured by drive shaft (16) which is connected in a way known in the art, with a cardan shaft, to the power takeoff shaft of the tractor (6). During this rotation, rollers (13) of tool-carrying arms (8) move in rolling path (24) of control cam (22). In the low portion (25) of this path (24), rollers (13) hold arms (8) in a position in which their tools (11) are almost vertical and rake the products spread on the ground. This raking zone is located essentially in the front part of the path of work tools (11). As soon as the rollers (13) are engaged in the highest portion (26) of this rolling path (24), they cause tool-carrying arms (8) to pivot around their respective longitudinal geometric axes (42) so that they lift their tools (11) over a zone of their path. These tools (11) then pivot upward and deposit the raked products in the form of a windrow. This depositing zone is located essentially on both sides of a plane P perpendicular to the direction of advance A and passing through central support pin (17). Following this depositing zone, rollers (13) come back to the low portion (25) and bring back arms (8) with tools (11) in the raking position.

In this work position, the three supports (31, 35, 36) carry the machine. They impart to it a good stability and make it possible for it to follow well the irregularities of the ground. Moreover, support (31) replaces itself automatically behind support pin (17) because of its adherence and its friction on the ground. The two supports (35, 36) which are located in front of support pin (17) are guided by rear support (31). This comes from the fact that they can pivot around vertical axes (38, 39) of their support (37) and thus follow automatically the direction imposed by the latter which is itself guided by rear support (31).

On the other hand, when tractor (6) and the machine enter a curve or a turn, rear support (31) orientates itself in the direction of movement imposed by tractor (6). Simultaneously, this support (31) causes support pin (17) to pivot around the longitudinal geometric axis (34) by connecting arm (30). The support pin (17) then automatically moves control cam (22) which is fastened to it. The cam (22) is thus also constantly oriented as a function of the direction that tractor (6) follows. Consequently, the depositing zone where the windrow is formed can vary in relation to frame (1) of the machine to stay in the vicinity of plane P which is perpendicular to direction of movement A. This depositing zone thus constantly remains at the ideal position for the formation of a regular and unscattered windrow.

Figure 3:
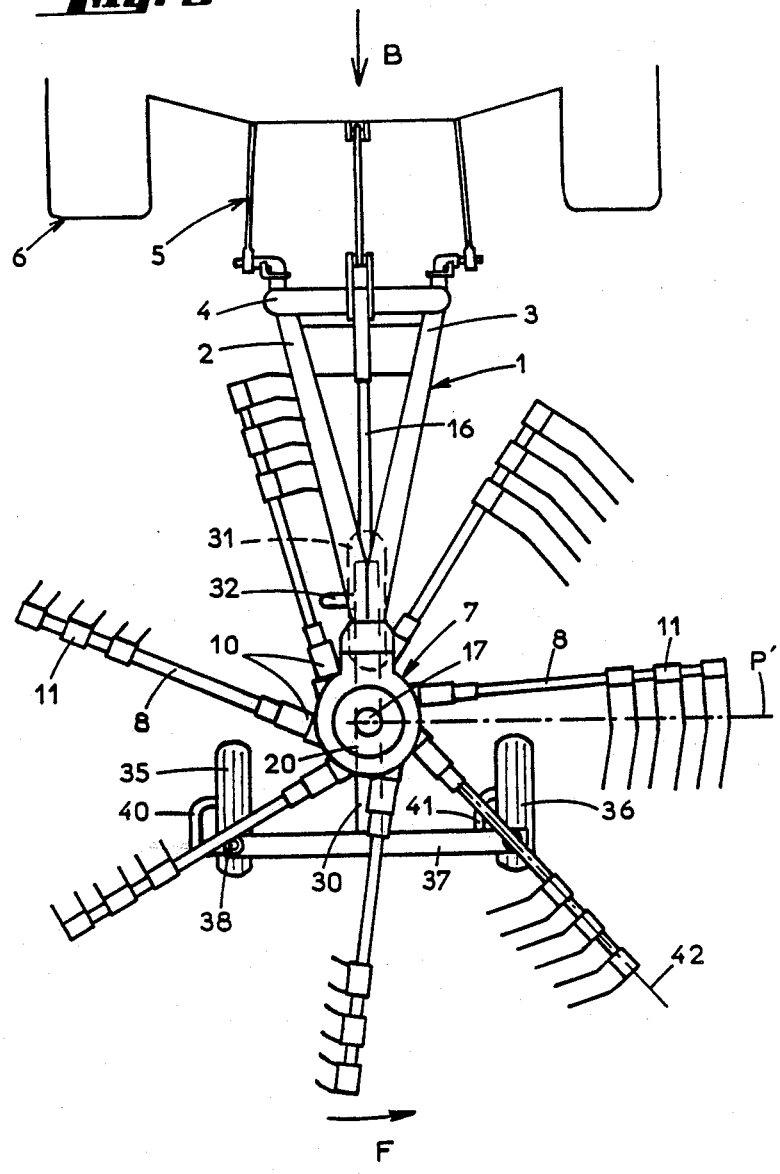
FIG. 3 is a top view of a machine according to the invention moved in the reverse direction of the direction of movement of the machine according to FIG. 1.

Moreover, if the user wants to use the machine in the front of the tractor or in reverse to avoid turning around at the end of a field, he has no adjusting to perform. Actually, as soon as the machine is pushed, as is represented in FIG. 3, stationary support (31) automatically replaces itself behind support pin (17) and again orientates itself in the direction of movement indicated by arrow B. For the same reason, it causes support pin (17) and control cam (22) to turn by an angle of about 80°. In this way, the scraping zone of work tools (11) is again located in the front part of their path and the depositing zone is located in the vicinity of plane P′ perpendicular to direction of movement B.

Figure 4:
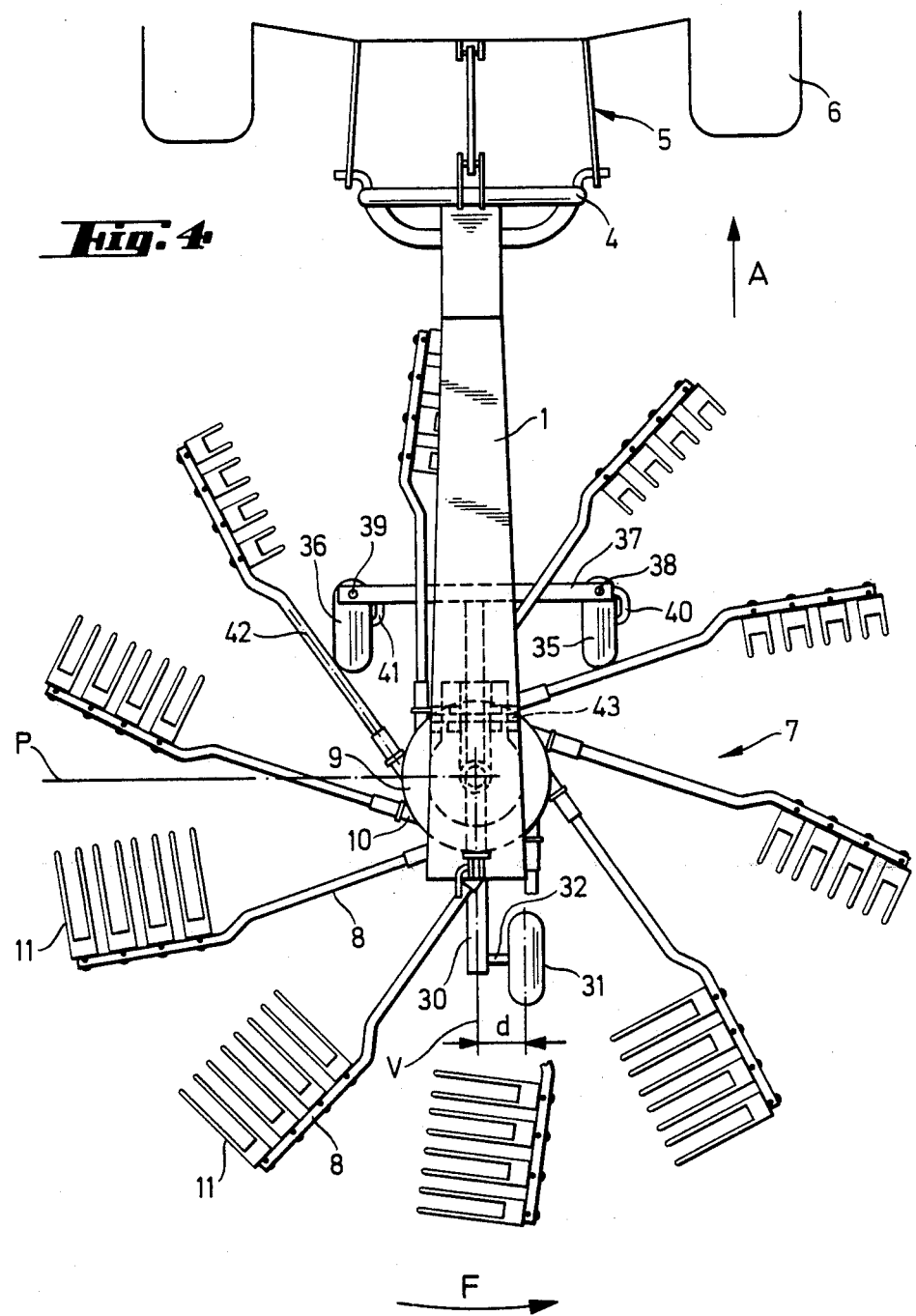
FIG. 4 is a top view of another embodiment of the machine to the present invention.
Figure 5:
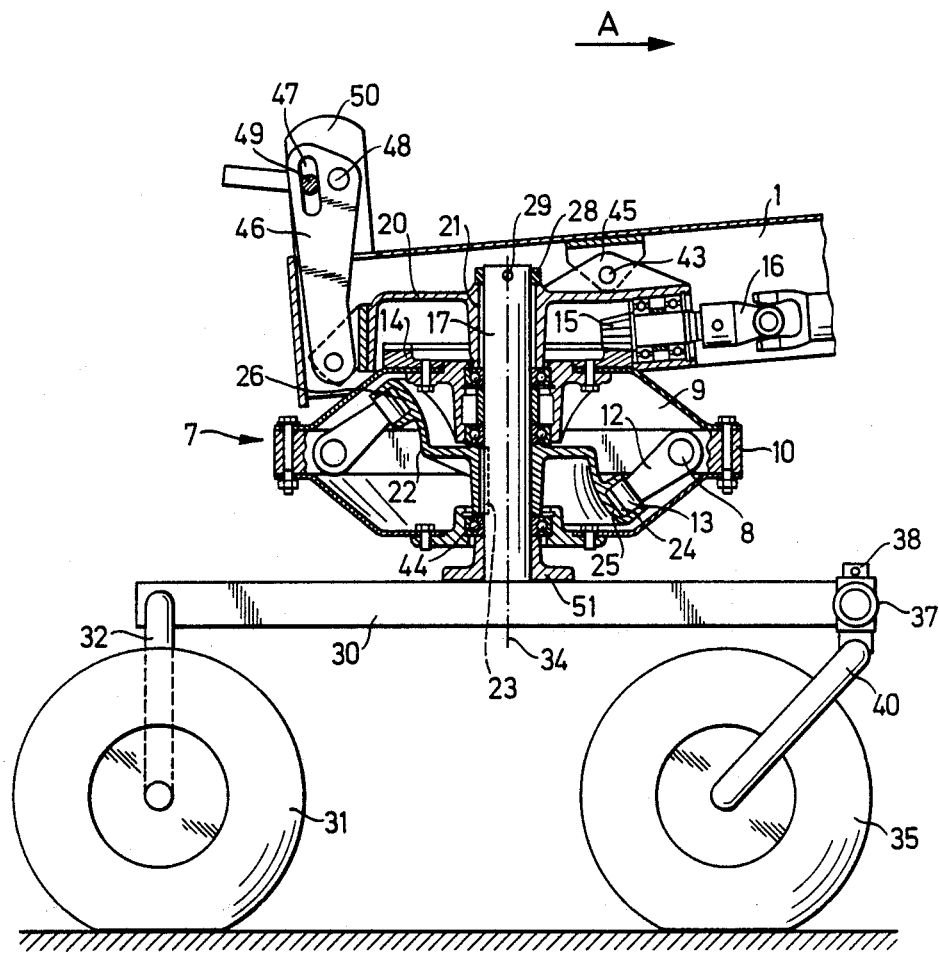
FIG. 5 is, on a larger scale, a cross-sectional view of the raking wheel of FIG. 4.

In the example of embodiment according to FIGS. 4 and 5, the parts common with the previous example are designated by the same references. These parts will no longer be described in detail.

It is clear from FIGS. 4 and 5 that frame (1) consists of a single beam. Raking wheel (7) is connected at the back end of frame (1) by an approximately horizontal hinge pin (43). This pin (43) is located near the upper end cf support pin (17). It is solid with frame (1) and goes through the orifices made in two lugs (45) provided on stationary cover (20). This cover also has tongue (46) making it possible to define the pivoting angle of raking wheel (7) around hinge pin (43). To do this, the tongue (46) is provided with an oblong hole (47) and a cylindrical hole (48) which can work with a bolt (49) solid with lugs (50) of frame (1). Thus, when bolt (49) is inserted through oblong hole (47) the raking wheel can pivot by a certain angle around hinge pin (43) to be able to follow the irregularities of the ground. On the other hand, when bolt (49) is engaged in cylindrical hole (48) the raking wheel is locked. This position is advantageous for transport.

In this example, the lower end of support pin (17) is also connected by a connecting arm (30) to a support (31) which rests on the ground during work. The support (31) is offset toward the back—seen in direction of movement A—in relation to pin (17) and offset laterally in relation to a vertical plane V which is directed in the direction of movement A and passes through support pin (17) (see FIG. 4). The support (31) is stationary in relation to connecting arm (30) in the horizontal plane. In the example shown, support (31) consists of a small wheel which rolls over the ground during work.

It can be seen in FIG. 4 that, in relation to plane V, the support (31) is located on the side toward which tool-carrying arms (8) move when they cross the plane V on the back half of their path—seen in direction of movement A. In the example shown, the offsetting is obtained by a column (32) connecting small wheel (31) to connecting arm (30). This offsetting could also be obtained by a slight bending of connecting arm (30). Value (d) of the lateral offsetting of small wheel (31) in relation to plane V is about 15 centimeters on the machine shown. This value (d) is such that the moment of the torque that small wheel (31) exerts on support pin (17) during movement in direction A is approximately equal to the moment of the torque exerted by rollers (13) of tool-carrying arms (8) on control cam (22). Since this latter torque can vary from one type of machine to another as a function of factors such as the number of tool-carrying arms and rollers (13), value (d) of the lateral offsetting can also vary in a range between 10 and 20 centimeter or even beyond.

Tow additional supports (35 and 36) are also connected to support pin (17). As in the previous example, the consist of pivoting small wheels located in front of support pin (17).

During work, the machine according to FIG. 4 is drawn by tractor (6) in direction A and raking wheel (7) is driven in rotation in the direction of arrow F. Support (31) is then placed automatically behind support pin (17) with a slight lateral offset in relation to plane V. In this way, it exerts a torque on support pin (17) which is approximately equal to that exerted by rollers (13) of tool-carrying arms (8) on control cam (22) which is solid with the pin (17). The two torques are balanced so that support (31) can move both against the direction of rotation F and in this direction. This makes it possible to assure a correct orientation of the assembly consisting of supports (31, 35, 36), support pin (17) and control cam (22) around geometrical axis (34) and to maintain a good stability of the assembly, even in fields exhibiting irregularities on their surface.

Thus, when tractor (6) and the machine enter a curve or a turn, rear support (31) easily orientates itself in the direction of movement. Simultaneously, it causes support pin (17) to pivot around longitudinal geometric axis (34) by connecting arm (30). The support pin (17) then automatically moves control cam (22) which is fastened to it. The control cam (22) is thus also constantly oriented as a function of the direction of movement. Consequently, the depositing zone where the windrow is formed ca vary in relation to frame (1) of the machine to stay in the vicinity of plane P which is perpendicular to the direction of movement A. This depositing zone thus remains constantly in the ideal position for the formation of a regular and unscattered windrow.

This automatic orientation of control cam (22) is also obtained when the machine is used in the front of a tractor or in reverse to avoid turning around at the end of a field.

The orientation of control cam (22) as described above is extremely simple and effective. It is performed continuously without intervention on the part of the user.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the U.S. is:

1. Haymaking machine comprising:
    a frame having at least one raking wheel and plural tool-carrying arms directed outward from said raking wheel;

a support pin freely rotatable in relation to said frame and coupled to said raking wheel so that said raking wheel is rotatable about said support pin;

a control cam fixedly connected to said support pin and having a cam surface coupled to said tool-carrying arms so that during work the tool-carrying arms rotate due to rotation of said raking wheel around the support pin, with the tool-carrying arms pivoting by means of said cam surface around their respective longitudinal axes so that the arms lift the respective tools carried by said arms in a predetermined zone of a path of said respective tools for the depositing of raked products;

at least a first support adapted to move over the ground during work, said first support offset from said support pin in a direction of movement of said machine; and connecting means for connecting said first support to said support pin, said connecting means being stationary in relation to said first support in a horizontal plane during work, said support pin and said cam fixedly connected to said support pin rotating in relation to changes in orientation of said first support due to a change in the direction of movement of said haymaking machine to maintain said cam surface in a predetermined orientation with respect to the direction of movement.

2. Machine according to claim 1, wherein, relative to the direction of movement, said first support is located behind said support pin.

3. Machine according to claim 2, wherein said support pin, said control cam and said at least first support are rigidly connected to one another and form an assembly that pivots around a geometric axis of said support pin.

4. Machine according to claim 3, comprising:
two additional supports connected to said support pin in addition to said first support, said two additional supports located in front of the support pin, in relation to the direction of movement.

5. Machine according to claim 4, wherein at least one of said supports is placed so that during work it exerts a torque on the support pin, which torque is approximately equal to a torque exerted by said tool-carrying arms on said control cam when the raking wheel is driven in rotation.

6. Machine according to claim 5, wherein said first support is, in addition, offset laterally by an amount (d) in relation to a vertical plane V directed in the direction of movement and passing through said support pin.

7. Machine according to claim 6, wherein in relation to said vertical plane V, said first support is located on a side toward which tool-carrying arms move when they cross said plane V on a back half of their rotational path.

8. Machine according to claim 6, wherein the amount (d) of the lateral offset of the first support in relation to plane V is such that the moment of the torque that the first support exerts on the support pin, during movement, is approximately equal to the moment of the torque exerted on control cam by coupling of tool-carrying arms to the control cam.

9. Machine according to claim 7, wherein the amount (d) of the lateral offset of the first support in relation to plane V is such that the moment of the torque that the first support exerts on control cam on the support pin, during movement, is approximately equal to the moment of the torque exerted on the control cam by coupling of tool-carrying arms to the control cam.

10. Machine according to claim 8, wherein the offset amount (d) of the offsetting is between 10 and 20 centimeters.

11. Machine according to claim 9, wherein the offset amount (d) of the offsetting is between 10 and 20 centimeters.

12. Machine according to claim 1, comprising:
a hinge by which the raking wheel, the support pin and the at least one support are hinged on said frame, said hinge located near an upper end of said support pin.

13. Machine according to claim 3, comprising:
a hinge by which the raking wheel, the support pin and the at least one support are hinged on said frame, said hinge located near an upper end of said support pin.

14. Machine according to claim 5, comprising:
a hinge by which the raking wheel, the support pin and the at least one support are hinged on said frame, said hinge located near an upper end of said support pin.

15. Machine according to claim 8, comprising:
a hinge by which the raking wheel, the support pin and the at least one support are hinged on said frame, said hinge located near an upper end of said support pin.

* * * * *